US011592295B2

United States Patent
Chau et al.

(10) Patent No.: US 11,592,295 B2
(45) Date of Patent: Feb. 28, 2023

(54) SYSTEM AND METHOD FOR POSITION CORRECTION

(71) Applicant: InvenSense, Inc., San Jose, CA (US)

(72) Inventors: Kyle Chau, Calgary (CA); Zainab Syed, Calgary (CA); Curtis Pidgeon, Calgary (CA); Christopher Goodall, Calgary (CA)

( * ) Notice: Subject to any disclaimer, the term of this patent is extended or adjusted under 35 U.S.C. 154(b) by 120 days.

(21) Appl. No.: 16/695,769

(22) Filed: Nov. 26, 2019

(65) Prior Publication Data

US 2021/0156690 A1 May 27, 2021

(51) Int. Cl.
*G01C 21/16* (2006.01)

(52) U.S. Cl.
CPC .................................. *G01C 21/16* (2013.01)

(58) Field of Classification Search
CPC ....................................................... G01C 21/16
See application file for complete search history.

(56) References Cited

U.S. PATENT DOCUMENTS

| | | | | |
|---|---|---|---|---|
| 2010/0332125 A1* | 12/2010 | Tan | ...................... | G01C 21/165 701/408 |
| 2011/0299733 A1* | 12/2011 | Jahangir | ............. | G01S 13/9029 382/103 |
| 2012/0221244 A1* | 8/2012 | Georgy | ................... | G01S 19/49 701/472 |
| 2012/0323520 A1* | 12/2012 | Keal | .................. | G01C 19/5776 702/141 |
| 2013/0173114 A1* | 7/2013 | Pillai | ...................... | B62D 6/008 701/41 |
| 2015/0382156 A1* | 12/2015 | Gruteser | ............... | H04W 4/026 455/456.1 |
| 2016/0116291 A1* | 4/2016 | Chien | .................... | G01C 21/26 701/519 |
| 2017/0138737 A1* | 5/2017 | Cordova | ................. | H04W 4/40 |
| 2018/0292212 A1* | 10/2018 | Bobye | .................... | G01C 21/18 |

OTHER PUBLICATIONS

Haofu Han, Jiadi Yu, Hongzi Zhu, Yingying Chen, Jie Yang, Yanmin Zhu, Guangtao Xue, Minglu Li, SenSpeed: Sensing Driving Conditions to Estimate Vehicle Speed in Urban Environments, 2014, IEEE Conference on Computer Communications, pp. 727-735 (Year: 2014).*

* cited by examiner

*Primary Examiner* — Khoi H Tran
*Assistant Examiner* — Tristan J Greiner

(57) ABSTRACT

Devices and methods for providing an enhanced navigation solution are disclosed that involve detecting correction events along a trajectory of a device. Platform speed is estimated based on characteristics of the correction events, such as by estimating speed of turn during the turn of the platform so that a navigation solution is enhanced by correcting the trajectory of the platform using the estimated speed.

22 Claims, 6 Drawing Sheets

SYSTEM AND METHOD FOR POSITION CORRECTION

FIELD OF THE PRESENT DISCLOSURE

The present disclosure relates to a method and system for enhancing at least one positioning/navigation solution derived from sensor data for a device, typically within a vehicle.

BACKGROUND

Electronic devices, such as portable devices configured to be handheld or otherwise associated with a user, are employed in a wide variety of applications and environments. Increasingly, such devices are equipped with one or more sensors or other systems for determining the position or motion of the device. Notably, portable devices such as smartphones, tablets, smart watches or others or portable devices may feature Global Navigation Satellite Systems (GNSS) receivers, low cost Micro Electro-Mechanical Systems (MEMS) inertial sensors, barometers and magnetometers. GNSS and multi-sensors can be integrated to provide promising positioning results in most outdoor environments. Moreover, these characteristics also apply to other types of electronic devices that may not fall within the category of portable devices. For example, similar technologies may be employed with dedicated telematic devices specifically configured to record motion and other navigational and usage information. Such devices may be installed as part of a vehicle manufacturing process or subsequently, either by the owner or by an interested third party such as an insurance company that uses the information for actuarial or other purposes.

There are clear benefits associated with the capability of providing seamless positioning capabilities in all kinds of environments such as malls, offices or underground parking lots. In the absence of GNSS signals in indoor environments, the conventional strapdown Inertial Navigation System (SINS) that uses low cost inertial sensors, suffers significant performance degradation due to the accumulated sensor drifts and bias. As such, positioning technologies relying solely on motion sensors may not satisfy all requirements for seamless indoor and outdoor navigation applications. Dead Reckoning (DR) is an example of indoor/outdoor positioning techniques, and has become the focus of industrial and academic research recently. Similar to the SINS, DR accumulates successive displacement from a known starting point to derive the position. This displacement can be estimated with various algorithms within a certain accuracy using the inertial sensor measurements. Nevertheless, inertial sensor based positioning techniques still suffer from accumulating errors.

Accordingly, it would be desirable to provide navigation techniques that can be corrected to improve the accuracy and reliability of positioning applications for any device having suitable motion sensors. Further, it would be desirable to obtain such correction even in the absence of other navigation strategies, such as when GNSS or other absolute position information is unavailable. It would also be desirable to achieve these goals using techniques that reduce computational demands and require fewer processing resources, allowing them to be implemented in cost and power efficient manners. As will be described in the following materials, this disclosure satisfies these and other needs.

SUMMARY

As will be described in detail below, this disclosure includes a method for providing an enhanced navigation solution of a device within a platform by obtaining motion sensor data from the device, wherein the device has at least one sensor assembly, comprising at least one accelerometer, and wherein the device is conveyed by the platform, generating a trajectory of the platform based at least on the motion sensor data, detecting at least first and second correction events along the trajectory, wherein at least one of the correction events comprises a turn of the platform, estimating speed of turn during the turn of the platform based on measurements from the accelerometer and enhancing a navigation solution by correcting the trajectory of the platform based at least on the motion sensor data using the estimated speed of turn.

This disclosure also include a device for providing an enhanced navigation solution as noted. The device may have at least one sensor assembly configured to output motion sensor data for the device when the device is conveyed by a platform, wherein the sensor assembly comprises at least one accelerometer and at least one processor configured to generate a trajectory of the platform based at least on the motion sensor data, detect at least first and second correction events along the trajectory, wherein at least one of the correction events comprises a turn of the platform, estimate speed of turn during the turn of the platform based on measurements from the accelerometer and enhance a navigation solution using the estimated speed by correcting the trajectory of the platform based at least on the motion sensor data using the estimated speed of turn.

BRIEF DESCRIPTION OF THE DRAWINGS

FIGS. 5-7 illustrate arrays suitable for applying corrections based on speed estimated during a correction event according to an embodiment.

DETAILED DESCRIPTION

Figure 1:
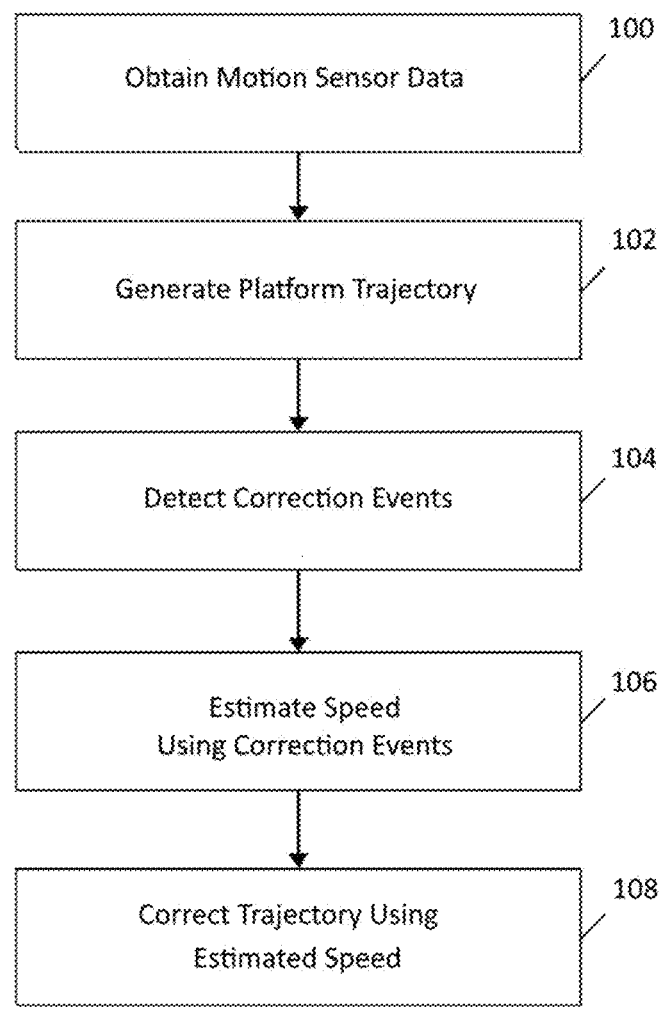
FIG. 1 is a flowchart showing a routine for enhancing a navigation solution for a device by correcting a trajectory using speed estimated during a correction event according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more sensor processing units (SPUs), motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU and a microprocessor, a plurality of microprocessors, one or more microprocessors in conjunction with an SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

Devices may have embedded technology for sensing the motion dynamics of the device, and may have other sensors that provide related information. For example, inertial sensors such as accelerometers and gyroscopes having multiple sensitive axes may be used to measure specific forces and angular rates, and consequently obtain changes in position and orientation. In some embodiments, inertial sensor data may be fused with data from other supplemental sensors such as magnetometers or barometers to improve position or orientation determinations. As used herein, the term "motion sensor data" refers to information from such inertial and non-inertial sensors that can be used to obtain changes in position, orientation or movement of the device, and by extension, any platform carrying the device by determining the relative orientation of the sensors in the device with respect to the platform. Such motion sensors give self-contained information, i.e. they do not depend on external source of information such as satellites or any other wireless transmission. The device can be strapped or non-strapped to the platform, and wherein in case of non-strapped, mobility of the device may be constrained or unconstrained within the platform, and wherein the device can be tilted to any orientation and still provide seamless navigation. When non-strapped, the device may be considered a portable device such as smartphones or wearables, which depending on the particular circumstances, may be placed in a cradle or other receptacle that provides some constraint with respect to the platform but may also be unconstrained. Similarly, other device configurations, such as dedicated telematic devices, may be strapped to the platform during manufacture or during subsequent use. Likewise, such devices may be employed in configurations other than strapped, such as constrained, with some degree of independent movement, or unconstrained, in known or unknown orientations that may vary with respect to the platform.

Thus, the sensor data of a device associated with a user can provide relevant information for applications such as navigation in which it is desirable to estimate aspects of a navigation solution comprising position, velocity and/or attitude. As noted above, typical conditions involve a user being conveyed by a platform such as vehicle or other vessel, but in some instances, the platform may be the user undergoing on foot motion. Consequently, the platform may be a manned or unmanned vehicle or vessel that contains the device and that may or may not convey a user with the device, such as an automobile or other wheeled vehicle (e.g., car, truck, bus, motorcoach, or the like), boat, heavy equipment, or other motorized vessels, whether a land-based vessel, a water-based vessel, an airborne vessel, or an under-water vessel. Notably, the device may be tethered (strapped) or untethered and mobility of the device may be constrained or unconstrained. Tethering typically indicates that the device is maintained in a fixed relationship to the platform. For example, the device may be placed in a cradle fixed to the vehicle or may be carried in a holster of the pedestrian. However, the techniques of this disclosure also apply when the device is not in a fixed relationship with the platform, such as when it is loose within a vehicle or being carried and operated in different manners by the user, i.e., untethered. Thus, the mobility of the device may be constrained or unconstrained depending on the circumstances. Further, even when tethered or otherwise constrained, the relative orientation of the device may not be known. For a device held in a vehicle cradle, it may be placed in a portrait, landscape or other orientation. Likewise, a device placed in a user's pocket may be up or down as well as facing inwards or outwards. As will be described in the following materials, the techniques of this disclosure apply in all of these situations. Thus, the wide variety of sensor data collected by a device, including measurements such as acceleration, angular velocity, the surrounding local Earth's magnetic field, location, height, and many others.

Thus, the techniques of this disclosure are directed to enhancing navigation solutions of a device, such as one associated with a platform that transports the device. Although the device generally maybe transported or conveyed in the direction of movement of the platform, its orientation may not be constrained. Returning to the example of the smartphone, it may be held in the user's hand and employed in a variety of orientations or carried in a pocket, holster, bag or other manners. In other examples, the device may be strapped to the platform, such as with a vehicle mount, or may be non-strapped. When non-strapped, the mobility of the device may be constrained or unconstrained within the platform and as a result, circumstances may exist such that the device can be tilted to any orientation with respect to the user or platform. The device may generate a series of navigation solutions over a given period of time.

As an illustration only and without limitation, a device that may be associated with a user in a vehicle or other platform, may derive a number of navigation solutions representing the trajectory of the user through the environment. In one aspect, the device may use any suitable real-time technique to generate those navigation solutions, including an inertial navigation routine employing dead reckoning, a reference-based location service utilizing a source of absolute navigation information, a location beaconing system or any other suitable technique, or combinations thereof. Although of substantial benefit, these real-time solutions may nonetheless suffer from inaccuracies or limitations. Again without limitation, an inertial dead reckoning system may be subject to drift or other error accumulation over time due to the characteristics of currently-employed sensors, such as micro electromechanical systems (MEMS) or a source of absolute navigation information such as a global navigation satellite system (GNSS) may suffer from poor reception in indoor environments.

Accordingly, the techniques of this disclosure utilize the detection of correction events to provide an independent source of information that may be used to enhance the navigation solutions provided by the device. The navigation solutions may include position, velocity or attitude determinations, in any desired combination, such as position, velocity and attitude, or position and attitude only, attitude and velocity only, or even attitude or position only. Since the navigation solution may suffer from inaccuracies, particularly over time as noted, enhancement of the navigation solution with the correction events may improve performance.

As will be described in further detail below, the techniques for enhancing a navigation solution of a device involve obtaining sensor data for the device and generating a trajectory representing its route through the environment. The device derives navigation solutions using the sensor data from which the trajectory is determined. The detection of correction events provide independent information that may be used to improve the accuracy of the determined trajectory. To help illustrate these aspects, FIG. 1 is a representative routine invoking the techniques of this disclosure. Beginning with 100, motion sensor data may be obtained for a device. In one aspect, the sensor data may be inertial sensor data from at least one accelerometer and optionally one or more gyroscopes or other suitable motion and/or orientation detection sensors. As indicated above, the sensor data may be used with techniques such as dead reckoning that relies on integration of the motion sensor data to provide navigation solutions that may be used in 102 to generate a trajectory of the platform. In 104, first and second correction events are detected along the trajectory. In one aspect, at least one of the correction events is a turn of the platform. Then, speed is estimated using characteristics of at least one of the correction events in 106, for example by estimating speed of turn during the turn of the platform based on acceleration measurements from the accelerometer. Other speed estimation may also be employed, provided they are independent of the integration operations of the motion sensor data used during dead reckoning, for example. Correspondingly, a navigation solution for the device may be enhanced in 108 by correcting the trajectory of the platform based at least on the motion sensor data using the estimated speed.

Figure 2:
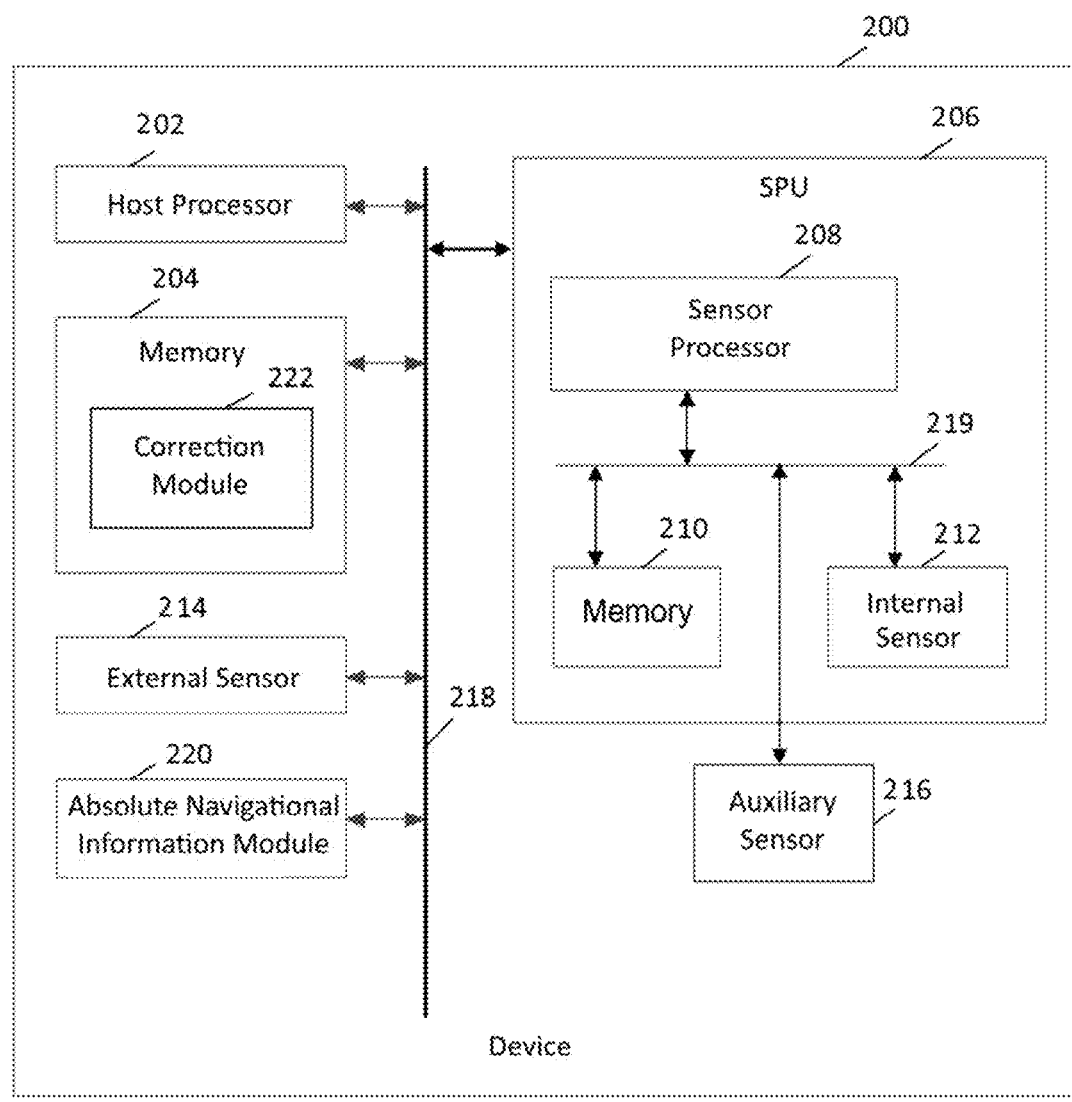
FIG. 2 is schematic diagram of a device for enhancing a navigation solution according to an embodiment.

As noted above, the device may include a sensor assembly including inertial motion sensors providing measurements that may be used in characterizing the motion of a platform. To help illustrate these features, a representative device 200 is depicted in FIG. 2 with high level schematic blocks. As will be appreciated, device 200 may be implemented as a device or apparatus, such as a handheld or portable device that can be moved in space by a user and its motion, location and/or orientation in space therefore sensed. For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices. In other embodiments, rather than a portable device, device 200 may be configured as a temporarily or permanently installed telematic device or other apparatus that nevertheless has the capability to provide motion sensor data with regard to a platform.

As shown, device 200 includes a host processor 202, which may be one or more microprocessors, central processing units (CPUs), or other processors to run software programs, which may be stored in memory 204, associated with the functions of device 200. Multiple layers of software can be provided in memory 204, which may be any combination of computer readable medium such as electronic memory or other storage medium such as hard disk, optical disk, etc., for use with the host processor 202. For example, an operating system layer can be provided for device 200 to control and manage system resources in real time, enable functions of application software and other layers, and interface application programs with other software and functions of device 200. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 200, and in some of those embodiments, multiple applications can run simultaneously.

Device 200 includes at least one sensor assembly, as shown here in the form of integrated sensor processing unit (SPU) 206 featuring sensor processor 208, memory 210 and internal sensor 212. As an example, SPU 206 may be a motion processing unit (MPU™), suitable implementations are available from InvenSense, Inc. of San Jose, Calif.). Memory 210 may store algorithms, routines or other instructions for processing data output by internal sensor 212 and/or other sensors as described below using logic or controllers of sensor processor 208, as well as storing raw data and/or motion data output by inertial sensor 212 or other sensors. Internal sensor 212 may be one or more sensors for measuring motion of device 200 in space, and includes at least one accelerometer. Depending on the configuration, SPU 206 measures one or more axes of rotation and/or one or more axes of acceleration of the device. In one embodiment, internal sensor 212 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 208, or other processing resources of device 200, combines data from internal sensor 212 to provide a six axis determination of motion. As desired, internal sensor 212 may be implemented using Micro Electro Mechanical System (MEMS) to be integrated with SPU 206 in a single package. Exemplary details regarding suitable configurations of host processor 202 and SPU 206 may be found in, commonly owned U.S. Pat. No. 8,250,921, issued Aug. 28, 2012, and U.S. Pat. No. 8,952,832, issued Feb. 10, 2015, which are hereby incorporated by reference in their entirety. A suitable implementation for SPU 206 in device 200 includes a Motion Processing Unit (MPU®) available from InvenSense, Inc. of San Jose, Calif.

Alternatively, or in addition, device 200 may implement a sensor assembly in the form of external sensor 214. External sensor 214 may represent one or more motion sensors as described above, such as an accelerometer and/or a gyroscope, that outputs data for categorizing, recognizing, classifying or otherwise determining device use case. As used herein, "external" means a sensor that is not integrated with SPU 206. In one aspect, external sensor 214 may represent one or more acoustic, infrared, ultrasonic, radio frequency, proximity and/or ambient light sensors. Also alternatively or in addition, SPU 206 may receive data from an auxiliary sensor 216 configured to measure one or more aspects about the environment surrounding device 200. For example, a barometer and/or a magnetometer may be used to refine position determinations made using internal sensor 212. In one embodiment, auxiliary sensor 216 may include a magnetometer measuring along three orthogonal axes and output data to be fused with the gyroscope and accelerometer inertial sensor data to provide a nine axis determination of motion. In another embodiment, auxiliary sensor 216 may also include a barometer to provide an altitude determination that may be fused with the other sensor data to provide a ten axis determination of motion. Although described in the context of one or more sensors being MEMS based, the techniques of this disclosure may be applied to any sensor design or implementation. Either or both of external sensor 214 and auxiliary sensor 216 may be a suitable source of supplemental sensor data in addition to motion sensor data, and other architectures may also be used to provide supplemental sensor data as desired.

In the embodiment shown, host processor 202, memory 204, SPU 206 and other components of device 200 may be coupled through bus 218, while sensor processor 208, memory 210, internal sensor 212 and/or auxiliary sensor 216 may be coupled though bus 219, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 200, such as by using a dedicated bus between host processor 202 and memory 204.

Multiple layers of software may be employed as desired and stored in any combination of memory 204, memory 210, or other suitable location. For example, a motion algorithm layer can provide motion algorithms that provide lower-level processing for raw sensor data provided from the motion sensors and other sensors. A sensor device driver layer may provide a software interface to the hardware sensors of device 200. Further, a suitable application program interface (API) may be provided to facilitate communication between host processor 202 and SPU 206, for example, to transmit desired sensor processing tasks. As such, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 202, sensor processor 208, a dedicated processor or any other processing resources of device 200.

As opposed to sensor-based information, such as information that may be obtained from the self-contained sensors represented by internal sensor 212, external sensor 214 and/or auxiliary sensor 216 discussed above, device 200 may also include absolute navigational information module 220 that provides any desired degree of location awareness capabilities. In one aspect, this may include a reference-based wireless system providing a source of absolute location information for device 200. Representative technologies that may be embodied by absolute navigational information module 224 include: (i) global navigation satellite system (GNSS) receiver such as global positioning system (GPS), GLONASS, Galileo and Beidou, or any other GNSS, as well as (ii) WiFi™ positioning, (iii) cellular tower positioning, (iv) Bluetooth-based positioning; (v) Bluetooth low energy (BLE)-based positioning; (vi) other wireless-based positioning; and (vii) visual light communication-based positioning or other similar methods.

In one aspect, the various operations of this disclosure may be implemented through correction module 222 as a set of suitable instructions stored in memory 204 that may be read and executed by host processor 202. Other embodiments may feature any desired division of processing between host processor 202, SPU 206 and other resources provided by device 200, or may be implemented using any desired combination of software, hardware and firmware. For example, correction module 222 may be configured to detect the correction events, which include at least one turn of the platform. Correction module 222 may also estimate speed of turn during the turn of the platform as well as correcting the trajectory of the platform the estimated speed of turn to enhance the navigation solution. Depending on the embodiment, correction module 222 may also be configured to estimate speed based on other characteristics of the correction events as discussed in further detail below.

Thus, techniques of this disclosure include methods for providing an enhanced navigation solution of a device within a platform by obtaining motion sensor data from the device, wherein the device has at least one sensor assembly, comprising at least one accelerometer, and wherein the device is conveyed by the platform, generating a trajectory of the platform based at least on the motion sensor data, detecting at least first and second correction events along the trajectory, wherein at least one of the correction events comprises a turn of the platform, estimating speed of turn during the turn of the platform based on measurements from the accelerometer and enhancing a navigation solution by correcting the trajectory of the platform based at least on the motion sensor data using the estimated speed of turn.

In one aspect, the speed of turn estimation may be based at least in part on centripetal acceleration measured by the sensor assembly. A radius for the speed of turn estimation may be derived from the generated trajectory.

In one aspect, enhancing the navigation solution may include determining a position of the platform at one of the turn correction events. The position may be determined using a corrected along-track speed. The corrected along-track speed may be based at least in part on a difference between the estimated speed of turn and an along-track speed derived from integration of along-track acceleration. The corrected along-track speed may be applied proportionally over an interval. For example, the interval may not exceed thirty seconds.

In one aspect, at least another of the correction events may be a change in availability of absolute navigational information.

In one aspect, at least one of the first and second correction events may occurs during a period of absolute navigational information unavailability.

In one aspect, at least another of the correction events may be a detected stationary period based on acceleration measurements from the accelerometer, by estimating along-track speed at the another correction event as zero. The stationary period is detected at least in part by analyzing moments of the motion sensor data to determine whether the signal is close to Gaussian.

In one aspect, at least another of the correction events may be a condition having an inferred along-track speed, by using a predetermined along-track speed at the another correction event. The predetermined along-track speed may be determined statistically.

In one aspect, a state estimation technique used to provide the navigation solution may be updated with the estimated speed of turn. Updating the state estimation technique may include proportionally applying a corrected along-track speed proportionally over an interval.

In one aspect, a bias for the sensor assembly may be updated based at least in part on a difference between the estimated speed of turn and an along-track speed derived from integration of along-track acceleration.

In one aspect, an error compensation may be derived using the estimated speed and applying the error compensation for subsequent determinations of the navigation solution.

In one aspect, at least one of the correction events may be based at least in part on a confidence measure of the navigation solution.

In one aspect, the enhanced navigation solution may be selectively applied based on the determined confidence in the motion sensor data.

Further, this disclosure includes a device for providing an enhanced navigation solution as noted. The device may have at least one sensor assembly configured to output motion sensor data for the device when the device is conveyed by a platform, wherein the sensor assembly comprises at least one accelerometer and at least one processor configured to generate a trajectory of the platform based at least on the motion sensor data, detect at least first and second correction events along the trajectory, wherein at least one of the correction events comprises a turn of the platform, estimate speed of turn during the turn of the platform based on measurements from the accelerometer and enhance a navigation solution using the estimated speed by correcting the trajectory of the platform based at least on the motion sensor data using the estimated speed of turn.

In one aspect, the sensor assembly may be an inertial sensor implemented as a Micro Electro Mechanical System (MEMS).

EXAMPLES

Figure 3:
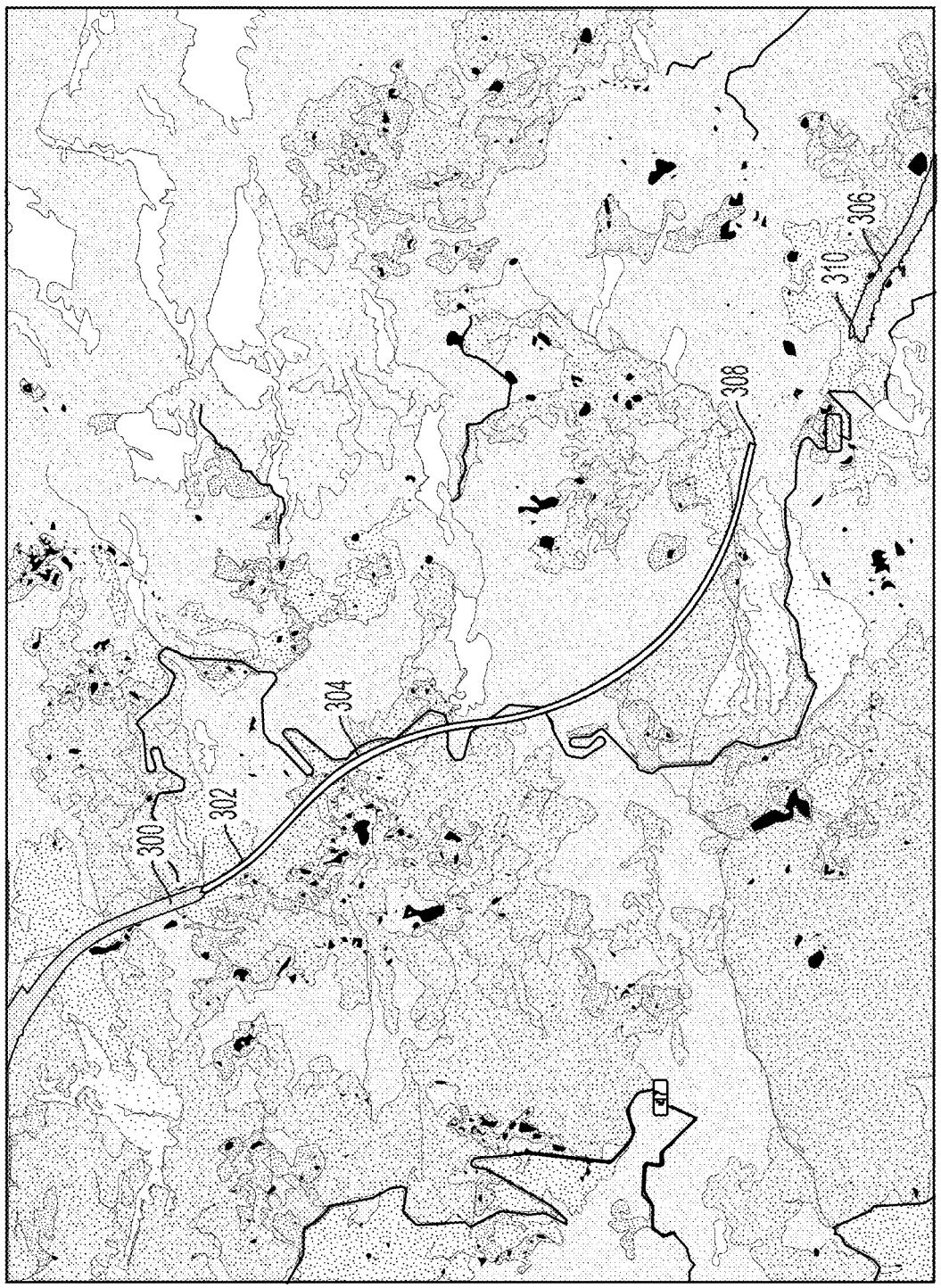
FIG. 3 is a schematic representation of accumulated position error from sensor-based dead reckoning during the absence of absolute navigational information.

As described above, the techniques of the disclosure may involve the detection of correction events to enhance a navigation solution for the device. To help illustrate aspects of this disclosure, FIG. 3 depicts an exemplary trajectory and the errors that can occur in the absence of GNSS or other absolute positioning information. Trajectory portion 300 represents a period of GNSS availability until the vehicle conveying the device enters a tunnel at point 302. Correspondingly, trajectory portion 304 represents position determinations obtained solely using motion sensor data. After the vehicle exits the tunnel, GNSS information is again available and is used in the determination of trajectory portion 306. Trajectory portion 304 has an accumulating position error that results in a discrepancy between end point 308 of this sensor-derived trajectory and the actual position 310 as determined when GNSS is again available. In this example, the tunnel was approximately 4 km in length, and the final position error indicated by the difference between points 308 and 310 was approximately 600 m. As will be appreciated, this represents a significant error and demonstrates the desirability of correcting a sensor-based trajectory to reduce drift and other inaccuracies.

Figure 4:
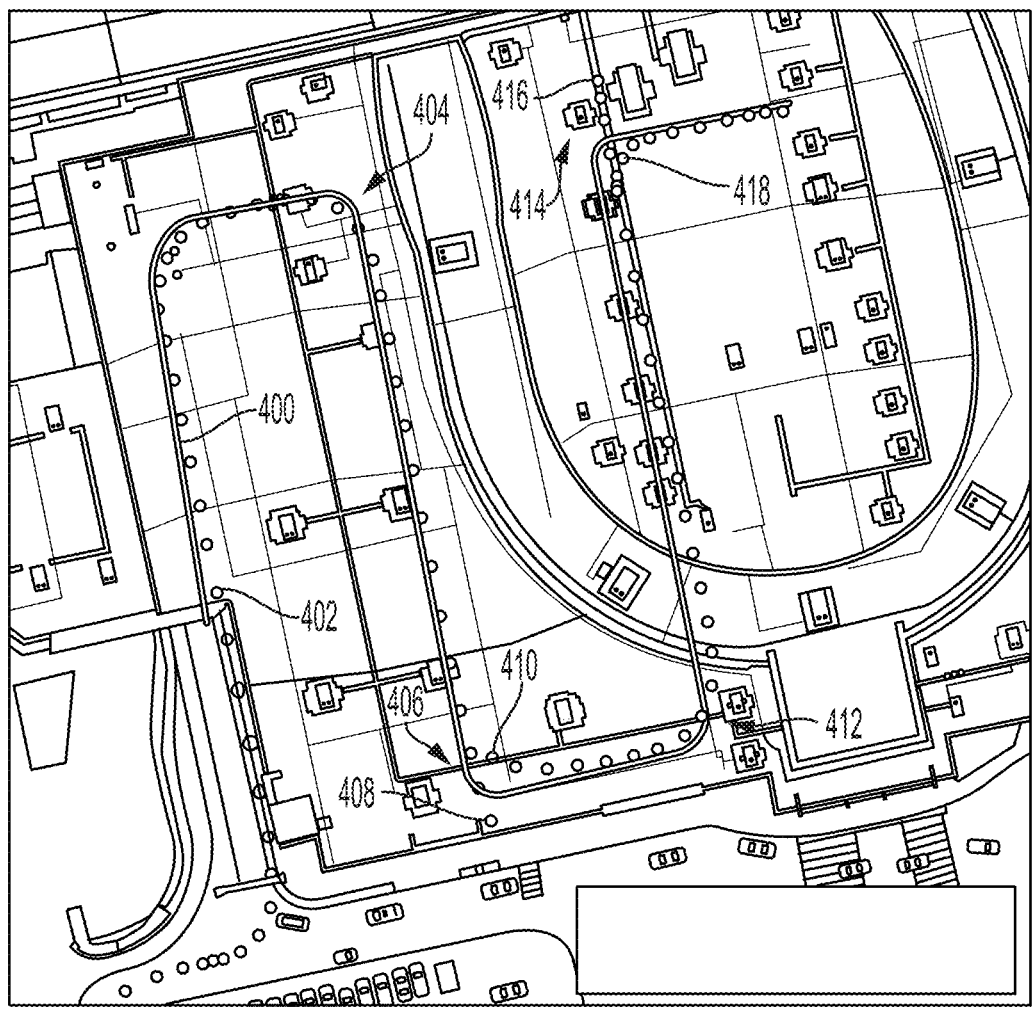
FIG. 4 is a schematic representation showing correction of a trajectory with respect to a reference trajectory according to an embodiment.

As noted above, the techniques of this disclosure relate to enhancing a device navigation solution by correcting a trajectory. As an example, FIG. 4 schematically depicts the navigation solutions obtained for a vehicle within a parking garage with respect to reference trajectory 400. The navigation solutions for each epoch are represented by the white dots and illustrate how the corrections applied yield a more accurate match to reference trajectory 400. At position 402, the vehicle enters the parking garage and represents the beginning of unavailability of GNSS signals. By detecting correction events, estimates of vehicle speed may be made independently of the integration of motion sensor data used for dead reckoning determinations. Consequently, such speed estimates can then be used to correct the dead reckoning trajectory.

As a first example, a vehicle turns 404 and 406 are detected and such platform turns can function as correction events because speed can be estimated during the turn from the centripetal or centrifugal acceleration measured by the accelerometer. A turn detection technique based on heading change may be used to detect the turns, under the assumption that change in heading is expected to be higher at turns than during straight segments. Using predefined thresholds, the technique may identify the points at which turns occur. Alternatively or in addition, turn detection may be performed using a technique that considers change in position, such that abrupt changes in position may identify turn locations. Equation (1) shows the relation between acceleration, speed and the radius of the turn:

$$A_c = v^2/r \qquad (1)$$

The acceleration $A_c$ is measured by the accelerometer and the radius r is derived from the positions of the relevant navigation solutions. Further details regarding determination of turning radius, or radius of rotation, may be found in commonly-owned U.S. Pat. No. 10,274,317, which is hereby incorporated by reference in its entirety. Since the speed estimated from this relationship is independent of the integration of accelerometer measurements used in dead reckoning, it does not suffer from the same sensor drift and can be used to correct the trajectory. In particular, position 408 shows the dead reckoning determination before correction and, due to sensor errors, reflects an along-track speed that is greater than the actual vehicle speed and results in a position that overshoots the actual position indicated by reference trajectory 400. By using the speed estimated from measured centripetal acceleration during turn 406, a correction can be applied to the trajectory over the interval between correction events. Consequently, position 410 reflects an updated vehicle position based on this estimated speed, which is seen to more accurately correspond to reference trajectory 400. Advantageously, environments that suffer from reduced GNSS availability may include those in which a platform is expected to make multiple, frequent turns during the trajectory, such as in a parking garage. Although the depicted examples involve substantially straight trajectory segments between the detected turns, the techniques are not limited to this condition. With suitable heading information, along-track speed can be determined for curved trajectory segments as well, even including the detected turns themselves. Nevertheless, such determination still employs integration of the motion sensor data and can be corrected by using independently-obtained speed estimation, such as calculated from centripetal acceleration and the turning radius.

Another suitable candidate for the correction events of this disclosure's techniques is the detection of a stationary period, since the speed during such a period may be estimated to be zero and likewise used to correct platform trajectory. As with the speed estimation during a turn of the platform, this stationary speed estimation does not rely on integration of motion sensor data. Detection of a stationary period can be accomplished by comparing accelerometer measurements to suitable thresholds with the expectation that a sufficient period of no acceleration (apart from gravity) indicates that the platform is stationary. Alternatively or in addition, stationary periods can also be detected by analyzing moments of sensor signals to determine whether they are Gaussian as explained in commonly-owned U.S. Pat. Nos. 8,843,345 and 10,309,983, which are hereby incorporated by reference in their entirety. In the context of the example of FIG. 4, vehicle turn 412 constitutes one correction event and a stationary period 414 constitutes a subsequent correction event, such that speed at stationary period 414 may be estimated to be zero and used to correct the trajectory interval following vehicle turn 412. Once again, the vehicle speed determined by integration of accelerometer readings was greater than the actual vehicle speed, resulting in the determination at position 416 overshooting reference trajectory 400. By applying the correction based on estimating speed at stationary period 414 to be zero, with position 418 showing that the updated position more closely conforms to reference trajectory 400.

Yet another suitable candidate for correction events are periods when platform speed can be inferred from information other than integration of the motion sensor data. For example, environments that are particularly suitable for the techniques of this disclosure are those that also exhibit degraded or unavailable GNSS signals, such as within a parking garage or a tunnel. In situations such as these, platform speed may be relatively highly constrained, allowing an estimated speed to be inferred. As an illustration, but without limitation, the inferred speed may be based on statistical models. Further, it will also be appreciated that correction events correspond to epochs when platform speed information is available from sources other than the integration of motion sensor data during dead reckoning. As such, a correction event can also be a moment when there is a change in availability of absolute navigational information. For example, up until the vehicle enters the parking garage at position 402, GNSS is available and may be expected to provide an accurate platform speed. Correspondingly, the trajectory can be monitored for the occurrence of a next correction event, so that the speed estimated at that correction event is used to correct the trajectory over the interval. Likewise, the resumption of GNSS availability may also represent a correction event that can be used to correct the trajectory over the prior interval.

In one implementation, correcting the trajectory using speed estimated for a correction event involves proportionally updating one or more aspects of the navigation solutions developed over the interval between correction events. One non-limiting technique is explained with reference to FIGS. 5-7. Beginning with FIG. 5, an array may be constructed using the dead reckoning platform speeds derived by integrating motion sensor data at epochs between correction events. As shown, the array has cells corresponding to epochs n, 1<n<1V, with correction events detected at 1 and N. In some embodiments, it may be desirable to employ architectures that emphasize reduction of processing requirements and/or increase efficiency. To reduce memory requirements, the size of the array may be limited and represent a defined correction interval, such as thirty seconds. Accordingly, when two correction events are not detected within the defined window, the correction may simply be applied as far back as the array allows. Platform speeds from the dead reckoning navigation solutions may be derived as appropriate, for example by using Equation (2).

$$\text{Speed}_n = \text{Speed}_{n-1} + (\text{IMU}_{Accel} * \Delta \text{ time}) \quad (2)$$

Although not shown in the interests of clarity, the array may also be used to store platform heading and/or position information (such as latitude/longitude pairs) as desired and depending on memory availability.

As noted, the speed value at array position N represents a platform speed estimated based on a correction event, such as speed of turn, stationary period or a predetermined speed that may be inferred to the platform based on its environment. Since the techniques of this disclosure assume that this estimated speed is more accurate than the speed derived by integrating motion sensor data as part of the dead reckoning navigation solutions, a correction factor may be determined based on the difference between the speed estimated at N and the speed at N−1, such as according to Equation (3).

$$\text{Difference}_{speed} = \text{Speed}_{N-1} - \text{Speed}_N \quad (3)$$

In this example, the estimated speed is based on a correction event corresponding to a stationary period and, as a result, the estimated speed at N is zero, so that the Difference$_{speed}$ value is 3.08. It will be appreciated that this routine may be adapted as necessary when the estimated speed is non zero. To apply this correction proportionately across the interval, it may be divided by the number of array entries as indicated in Equation (4).

$$\text{Correction}_{speed} = \frac{\text{Difference}_{speed}}{N} \quad (4)$$

Figures 5, 6, 7:
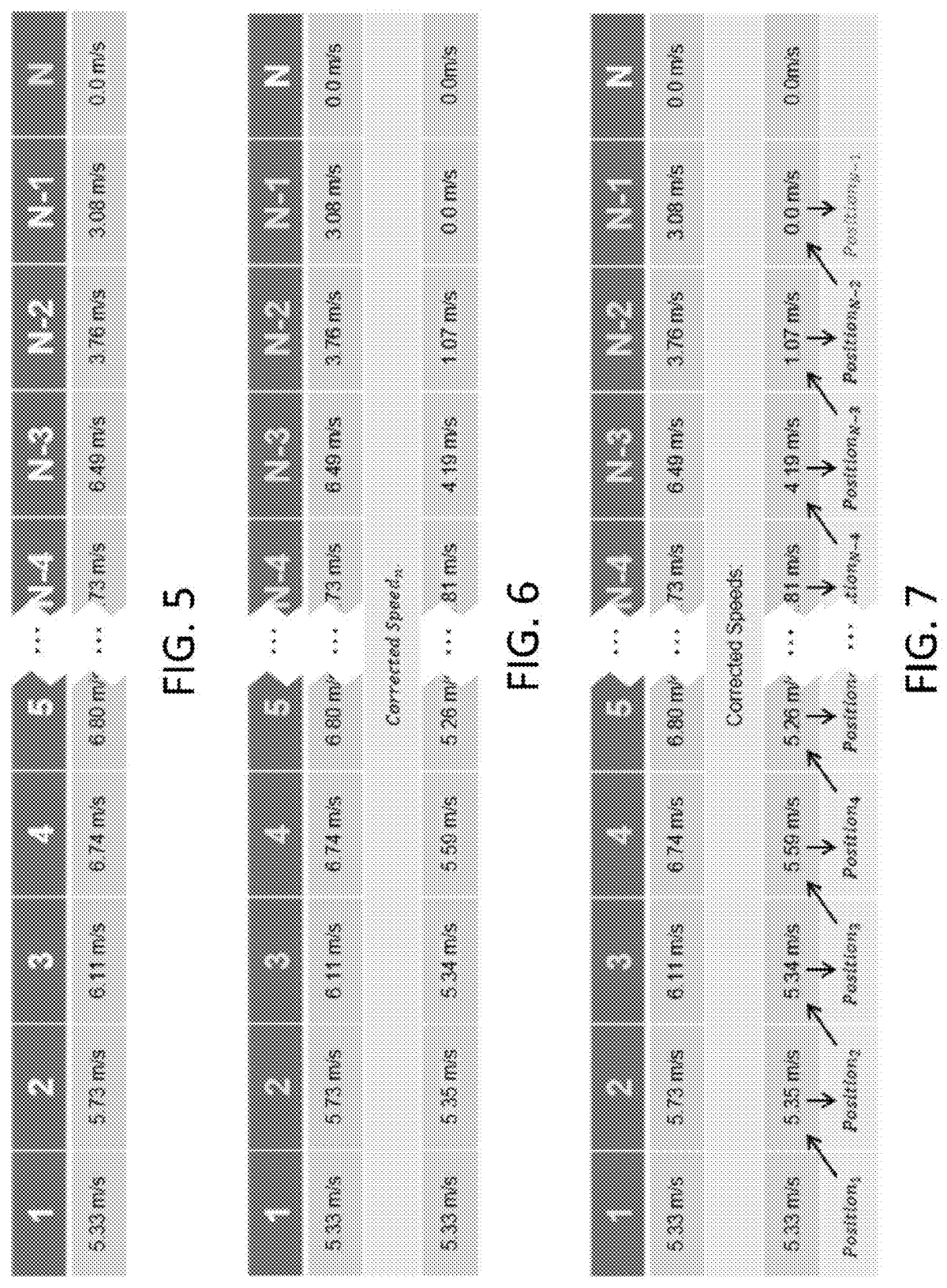

Since the array size in this example is 16 seconds, with each cell representing a two second epoch, N is equal to 8 and the correction to be applied to each n is 0.385. Once more, these values are illustrative only and should not be considered limiting. Notably, arrays of any size and length may be employed as desired. Thus, FIG. 6 shows updates to the array achieved by applying the Correction$_{speed}$ to each speed derived by integrating the motion sensor data. As this correction accumulates, the corrected speed approaches and then equals the estimated speed by the n−1 epoch. Importantly, these techniques help mitigate unaccounted accelerometer bias in the along-track direction and/or unaccounted/unknown systematic errors.

Further, these corrections can also be propagated to the positions determined at each epoch, such as through the use of Equation (5), which is performed over the interval 1<k≤N−1 using a function $f( )$ configured to compute position using speed, heading and the position from the previous epoch.

$$\text{Position}_k = f(\text{Position}_{k-1}, \text{Corrected Speed}_k, \text{Platform Heading}_k) \quad (5)$$

In the context of FIG. 4, the corrected Position$_k$ at n−1 represents the corrected position 410 or 418 as compared to the positions determined solely through dead reckoning, positions 408 or 416, respectively. As will be appreciated, these corrected positions may then be used to update the state estimation technique used to derive the navigation solutions, such as a Kalman filter. Further, an additional Kalman filter can be run using more or all of the corrected speed and position data to provide an even more accurate navigation solutions for implementations that can budget the increased processing power. Although accuracy is improved, such approaches do require memory storage at a higher rate and faster processing capabilities for the increased calculations.

Figure 8:
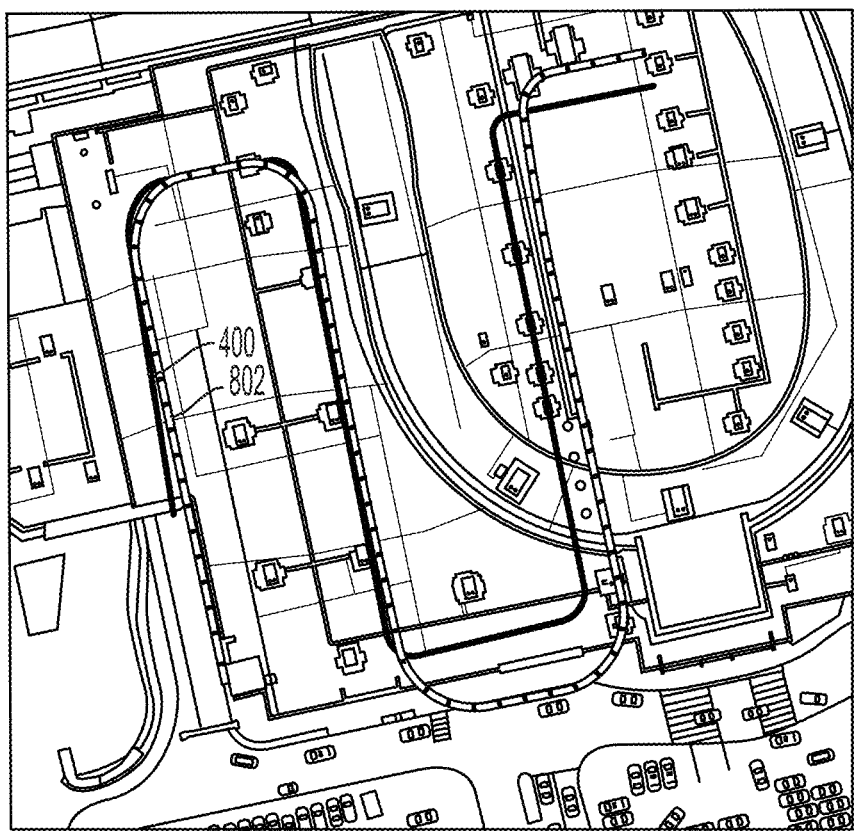
FIG. 8 illustrates a comparison between a trajectory based only on integration of motion sensor data and a trajectory corrected using speed estimated during correction events according to an embodiment.
Figure 8:
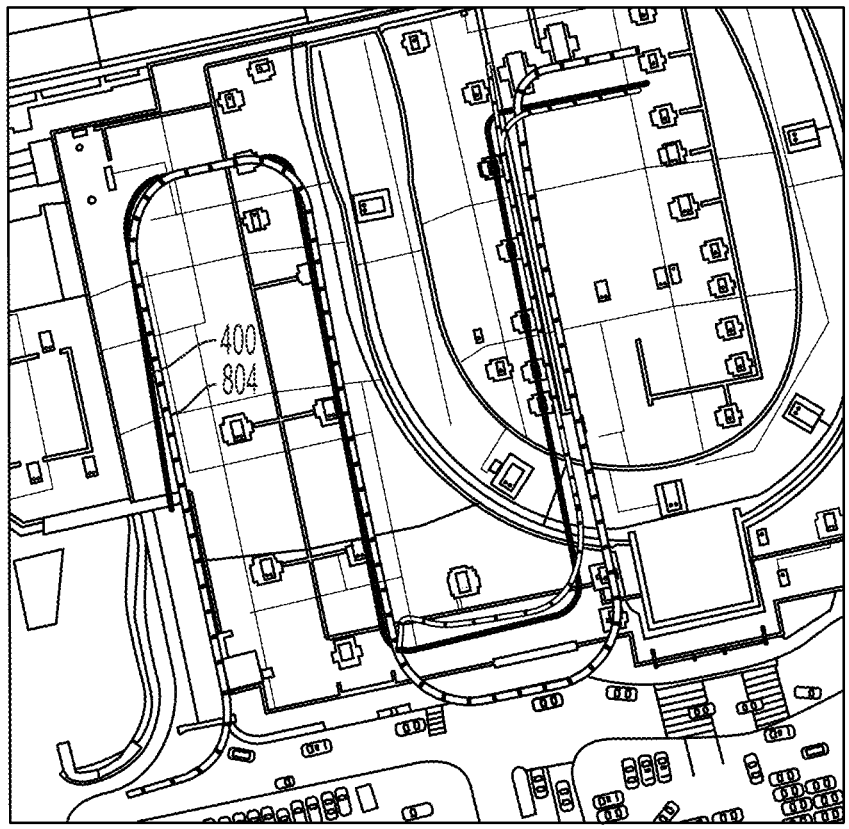

For comparison, FIG. 8 summarizes the impact of applying the techniques of this disclosure in the context of the trajectory shown in FIG. 4. In both the top and bottom views, reference trajectory 400 is again shown, with the top view illustrating trajectory 802 as derived from dead reckoning navigation solutions alone without correction and the bottom view illustrating trajectory 804 as adjusted using the estimated speeds from the correction events discussed above. Notably, corrected trajectory 804 corresponds more closely to reference trajectory 400, indicating the benefits of these techniques as compared to the conventional dead reckoning approach that generates trajectory 802.

Also, it will be appreciated that the techniques of this disclosure may be employed to quantify unaccounted measurement errors. Adjustments for these errors can be applied to future measurements to attempt to remove the position drift before it occurs. For example, it will be appreciated that the speed correction is essentially the unaccounted error in the along-track accelerometer bias, which can be updated and applied to future along-track accelerometer measurements to reduce sensor drift.

From the above, it may be noted that the techniques of this disclosure may be employed to help correct for inaccuracies resulting accumulating errors in sensor readings, such as those used to provide dead reckoning navigation solutions. As such, it may be desirable to assess the accuracy of the dead reckoning solution, such as by employing a confidence measure. For example, the state estimation technique used to generate the navigation solution may output a confidence measure that reflects expected accuracy. Consequently, at least one of the correction events may be based at least in part on a confidence measure of the navigation solution. As a non-limiting illustration, one or more thresholds used for detecting correction events may be lowered when the confidence measure is low in order to more readily detect such events. Further, the decision of whether to enhance the navigation solution using the speed estimated from the correction events may be selectively applied based on the determined confidence in the motion sensor data and the resulting dead reckoning navigation solutions.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for providing an enhanced navigation solution of a device within a platform, the method comprising:
    a) obtaining motion sensor data from the device, wherein the device has at least one sensor assembly, comprising at least one accelerometer, and wherein the device is conveyed by the platform;
    b) generating a trajectory of the platform based at least on the motion sensor data;
    c) detecting at least first and second correction events along the trajectory, wherein the correction events are independent of integration operations of the motion sensor data used during dead reckoning and wherein at least one of the correction events comprises a turn of the platform;
    d) estimating speed of turn during the turn of the platform based on measurements from the accelerometer;
    e) after detecting the first and second correction events, updating navigation solutions of the device between the first and second correction events based at least on the motion sensor data using the estimated speed of turn; and
    f) enhancing a current navigation solution of the device by correcting the trajectory of the platform based at least on the updated navigation solutions between the first and second correction events.

2. The method of claim 1, wherein the speed of turn estimation is based at least in part on centripetal acceleration measured by the sensor assembly.

3. The method of claim 2, wherein a radius for the speed of turn estimation is derived from the generated trajectory.

4. The method of claim 1, wherein enhancing the navigation solution comprises determining a position of the platform at one of the turn correction events.

5. The method of claim 4, wherein the position is determined using a corrected along-track speed.

6. The method of claim 5, wherein the corrected along-track speed is based at least in part on a difference between the estimated speed of turn and an along-track speed derived from integration of along-track acceleration.

7. The method of claim 6, wherein the corrected along-track speed is applied proportionally over an interval.

8. The method of claim 7, wherein the interval does not exceed thirty seconds.

9. The method of claim 1, wherein at least another of the correction events comprises a change in availability of absolute navigational information.

10. The method of claim 1, wherein at least one of the first and second correction events occurs during a period of absolute navigational information unavailability.

11. The method of claim 1, wherein at least another of the correction events comprises a detected stationary period based on acceleration measurements from the accelerometer, further comprising estimating along-track speed at the another correction event as zero.

12. The method of claim 11, wherein the stationary period is detected at least in part by analyzing moments of the motion sensor data to determine whether the signal is close to Gaussian.

13. The method of claim 1, wherein at least another of the correction events comprises a condition having an inferred along-track speed, comprising using a predetermined along-track speed at the another correction event.

14. The method of claim 13, wherein the predetermined along-track speed is determined statistically.

15. The method of claim 1, further comprising updating a state estimation technique with the estimated speed of turn, wherein the state estimation technique used to provide the navigation solution.

16. The method of claim 15, wherein updating the state estimation technique comprises proportionally applying a corrected along-track speed proportionally over an interval.

17. The method of claim 1, further comprising updating a bias for the sensor assembly based at least in part on a difference between the estimated speed of turn and an along-track speed derived from integration of along-track acceleration.

18. The method of claim 1, further comprising deriving an error compensation using the estimated speed and applying the error compensation for subsequent determinations of the navigation solution.

19. The method of claim 1, wherein at least one of the correction events is based at least in part on a confidence measure of the navigation solution.

20. The method of claim 1, wherein the enhanced navigation solution is selectively applied based on the determined confidence in the motion sensor data.

21. A device for providing an enhanced navigation solution, comprising:
   a) at least one sensor assembly configured to output motion sensor data for the device when the device is conveyed by a platform, wherein the sensor assembly comprises at least one accelerometer; and
   b) at least one processor configured to:
      i) generate a trajectory of the platform based at least on the motion sensor data;
      ii) detect at least first and second correction events along the trajectory, wherein the correction events are independent of integration operations of the motion sensor data used during dead reckoning and wherein at least one of the correction events comprises a turn of the platform;
      iii) estimate speed of turn during the turn of the platform based on measurements from the accelerometer;
      iv) after detection of the first and second correction events, update navigation solutions of the device between the first and second correction events based at least on the motion sensor data using the estimated speed of turn; and
      v) enhance a current navigation solution of the device using the estimated speed by correcting the trajectory of the platform based at least on the updated navigation solutions between the first and second correction events.

22. The device of claim 21, wherein the sensor assembly comprises an inertial sensor implemented as a Micro Electro Mechanical System (MEMS).

* * * * *